United States Patent
Watanabe

(10) Patent No.: US 9,463,683 B2
(45) Date of Patent: Oct. 11, 2016

(54) ANTI-FOG AND HVAC SYSTEM FOR ELECTRIC VEHICLES

(76) Inventor: Takumasa Watanabe, Kanagawa (JP)

( * ) Notice: Subject to any disclaimer, the term of this patent is extended or adjusted under 35 U.S.C. 154(b) by 1158 days.

(21) Appl. No.: 13/514,381

(22) PCT Filed: Dec. 8, 2010

(86) PCT No.: PCT/JP2010/073639
§ 371 (c)(1),
(2), (4) Date: Jun. 7, 2012

(87) PCT Pub. No.: WO2011/071192
PCT Pub. Date: Jun. 16, 2011

(65) Prior Publication Data
US 2012/0241127 A1    Sep. 27, 2012

(30) Foreign Application Priority Data

Dec. 11, 2009    (JP) ................. 2009-281860

(51) Int. Cl.
*B60H 3/02*     (2006.01)
*B01D 53/26*    (2006.01)
*B60H 1/00*     (2006.01)
(Continued)

(52) U.S. Cl.
CPC ............ *B60H 3/024* (2013.01); *B01D 53/261* (2013.01); *B60H 1/00564* (2013.01); *B60H 3/0633* (2013.01); *B01D 53/0462* (2013.01); *B01D 53/28* (2013.01); *B01D 2259/40096* (2013.01); *B01D 2259/4566* (2013.01); *B60H 3/022* (2013.01); *B60H 2001/2281* (2013.01)

(58) Field of Classification Search
CPC ............ B60H 3/024; B60H 1/005564; B60H 3/0633; B60H 3/022; B60H 2001/2281; B01D 53/261; B01D 53/0462; B01D 53/28; B01D 2259/40096; B01D 2259/4566
USPC .............................. 165/202, 42, 41
See application file for complete search history.

(56) References Cited

U.S. PATENT DOCUMENTS 4,391,616 A * 7/1983 Imamura ............. B01D 53/261
                                                    55/527
5,697,223 A  12/1997 Ishii
(Continued)

FOREIGN PATENT DOCUMENTS

DE    1935839 A1    3/1970
DE    4441264 A1    5/1996
(Continued)

OTHER PUBLICATIONS

International Search report for corresponding PCT Application PCT/JP2010/073639, dated Mar. 15, 2011.
(Continued)

*Primary Examiner* — Tho V Duong
*Assistant Examiner* — Raheena Rehman
(74) *Attorney, Agent, or Firm* — Matthew B. Dernier, Esq.

(57) ABSTRACT

To solve this problem, a desiccant humidity control technique is used, in which moisture emitted from passengers is absorbed, so as to suppress rising of an absolute humidity, by a desiccant which absorbs moisture in air or discharges moisture into air by the difference in relative humidity to air, and air with a high temperature is generated by utilization of heat generated by moisture absorption. This air is sprayed to a front window and other areas so as to cause defogging as well as heat the interior of the vehicle.

7 Claims, 1 Drawing Sheet

(51) Int. Cl.
*B60H 3/06* (2006.01)
*B01D 53/04* (2006.01)
*B01D 53/28* (2006.01)
*B60H 1/22* (2006.01)

(56) References Cited

U.S. PATENT DOCUMENTS

| | | | |
|---|---|---|---|
| 7,470,311 B2 * | 12/2008 | Sueoka | B01D 53/0438 62/271 |
| 2003/0221820 A1 * | 12/2003 | Drucker | B60H 1/00335 165/202 |
| 2005/0230096 A1 | 10/2005 | Yamaoka | |
| 2007/0284095 A1 * | 12/2007 | Wang | F28D 7/10 165/166 |
| 2008/0110044 A1 * | 5/2008 | Ehlers | D06F 58/20 34/524 |
| 2010/0022177 A1 * | 1/2010 | Hidaka | B60H 1/00478 454/156 |
| 2010/0107656 A1 * | 5/2010 | Nakaguro | B60H 3/02 62/3.4 |
| 2010/0107673 A1 | 5/2010 | Nakaguro | |
| 2014/0338883 A1 * | 11/2014 | Watanabe | B60H 3/024 165/287 |

FOREIGN PATENT DOCUMENTS

| | | | | |
|---|---|---|---|---|
| DE | 19718047 A1 * | 11/1998 | | B60H 3/024 |
| JP | 5270252 A | 10/1993 | | |
| JP | 8067136 A | 3/1996 | | |
| JP | 8169231 A | 7/1996 | | |
| JP | 2000061250 A | 2/2000 | | |
| JP | 2002001114 A | 1/2002 | | |
| JP | 2005021482 A | 1/2005 | | |
| JP | 2005132690 A | 5/2005 | | |
| JP | 2006200836 A | 8/2006 | | |
| JP | 2007032912 A | 2/2007 | | |
| JP | 2008302874 A | 12/2008 | | |
| JP | 2009097837 A | 5/2009 | | |
| JP | 2009154862 A | 7/2009 | | |
| KR | 20090127368 A | 12/2009 | | |

OTHER PUBLICATIONS

Office Action for corresponding Japanese Application No. 2009-281860, dated Jan. 18, 2011.
Office Action for corresponding Japanese Application No. 2009-281860, dated May 31, 2011.
Office Action for corresponding Japanese Application No. 2009-281860, dated Aug. 10, 2011.
European Search report for corresponding EP Application No. 10836103.4, dated Oct. 14, 2013.

* cited by examiner

US 9,463,683 B2

ANTI-FOG AND HVAC SYSTEM FOR ELECTRIC VEHICLES

TECHNICAL FIELD

The present invention relates to a heating, ventilation, and air conditioning (HVAC) system for indoor climate control in vehicles such as electric vehicles. More particularly, the present invention relates to an anti-fog and HVAC system for electric vehicles that controls relative humidity of the air near the windows to eliminate moisture condensation and prevent fogging on the windows that otherwise can obstruct the driver's view.

BACKGROUND ART

In recent years, global warming trend has become more pronounced. Efforts are being made to introduce electric vehicles which use absolutely no fossil fuel as well as hybrid vehicles such as hybrid cars powered by some fossil fuels, in order to reduce emissions of carbon dioxide, a greenhouse gas, as part of measures to the global warming.

Regardless of the fuel being used, moisture condensation occurs on the glass windows during periods such as in winter when the outside air temperature is lower than the inside temperature. Such condensation can obstruct the driver's view and interfere with safety in driving, and electric vehicles are no exception. Water loss (insensible perspiration) of a passenger would be a cause of this condensation problem.

Dehumidification of the air inside the passenger compartment is a measure against the problem in question. However, cooling/dehumidification using a compression refrigeration system as those employed in traditional vehicles is not suitable for the electric or hybrid vehicles. Consumption of a significant amount of electricity to heat the cold air causes a secondary problem of a decrease in running mileage.

An example is given now. It is assumed that three passengers get in an electric vehicle having an interior volume of 4 $m^3$ (=air weight of 4.8 kg) at an outside temperature of 5° C., 60% RH (absolute humidity of 2.6 g/kg). Water lost through insensible perspiration is estimated to be 30 g/h per person for adults, so that the absolute humidity increases by 18.8 g/kg per hour in the interior of the vehicle. When the air temperature near the glass windows is 5° C., it takes about 9 minutes to reach the relative humidity of 100% (absolute humidity of 5.4 g/kg), at which point condensation (fogging of the windows) begins.

Traditional vehicles use the heat that the engine dissipates and is passed through a heater warming the air near the glass windows to reduce the relative humidity of the air, thereby avoiding condensation. However, this approach cannot be applied to the electric vehicles having no effective hear source.

Consuming the electric power for heating to raise the temperature of the passenger compartment or to dissipate the fog results in a shorter running mileage of the electric or hybrid vehicle and a larger lithium ion battery which is rather expensive. Such a situation is undesirable in the economic considerations, so that quick development of an anti-fog and HVAC system that uses less electricity is required.

Recently, desiccant humidity control has been proposed as an effective means for air dehumidification. For example, Patent Document 1 shows an HVAC system in which two desiccants (dehumidifying agents placed in a desiccant wheel) are arranged so that they can rotate between a process air path and a regeneration air path. When one desiccant accepts moisture from the process airstream, the other desiccant is regenerated by passing the regeneration air through. Two desiccants are alternately used to dehumidify the outdoor air to be introduced into the passenger compartment.

RELATED-ART DOCUMENT

Patent Document

Patent Document 1: Japanese Patent Laid-Open No. 2007-032912.

SUMMARY OF THE INVENTION

Problems to be Solved by the Invention

Traditional vehicles use an air conditioner to remove the haze or fog caused by insensible perspiration from a passenger that is fogging up on the glass windows, even in winter. The air inside the passenger compartment is thus cooled below dew point to dehumidify it. Subsequently, a heater is used to raise the temperature of the cold air to provide air having low relative humidity. This air is supplied to the windows to remove the haze or fog on the windows.

In addition, the dehumidifying agents in the desiccant HVAC system described in the aforementioned Patent Document are subjected to repeated adsorption and regeneration processes in a relatively short period of time. This requirement complicates the system configuration. Besides, it is not practical to apply this system to the electric vehicles because a significant amount of electricity is required for the regeneration of the dehumidifying agents in a continuous operation.

As apparent from the above, unlike the traditional vehicles having the dissipated heat already inside their own, little or no such heat can be used as a heat source in the electric vehicles and the hybrid vehicles with a small power generator fitted in the interior to generate electricity to power the engine. Using the electricity stored in a battery or batteries for heating the air is troublesome from the viewpoint of, for example, reducing the mileage. Therefore, an important challenge to provide a safe and comfortable electric vehicle is to establish a technique to remove the haze or fog or prevent the formation of dew on the glass windows and warm the passenger compartment with a minimum consumption of electricity when it is driving.

The present invention provides a desiccant HVAC technique as a means to remove the haze or fog or prevent formation of dew on the glass window which otherwise would cause a problem when an electric and hybrid vehicle is driving and to provide a heat source for warming the passenger compartment, in which moisture due to insensible perspiration (about 30 g/h per person) of a passenger is removed from the air by bringing it in contact with a fixed dehumidifying agent of a large capacity to provide air having low humidity, and the latent heat released by the dehumidifying agent as it absorbs moisture is used for warming the passenger compartment.

Needless to say, a dehumidifying agent of a large capacity is required for long drive. Another important issue is to determine appropriate timing to regenerate the dehumidifying agents after they absorb a large amount of moisture.

The present invention utilizes a means to regenerate the dehumidifying agents during the time when an electric or hybrid vehicle is stopped and/or when a battery is being charged. More specifically, there is provided a means in which moisture due to insensible perspiration of a passenger is allowed to be absorbed onto the dehumidifying agents when the vehicle is driving while making good use of the ability of the dehumidifying agents to absorb moisture, and the dehumidifying agents are effectively regenerated during the time when an electric or hybrid vehicle is stopped and/or when a battery is being charged by using commercial electricity.

As apparent from the above, the essential feature of the present invention lies in the fact that the time interval when the electric or hybrid vehicle is stopped, or parked, is used for the regeneration of the dehumidifying agents while the time interval when it is driving is used for absorbing moisture using the dehumidifying agents. Commercial electricity is used to produce air of low relative humidity for the regeneration of the dehumidifying agent achieved during the time when the vehicle is stopped. This dry air is used to regenerate the dehumidifying agent. On the other hand, the dehumidifying agent absorbs moisture due to insensible perspiration of a passenger to suppress increase in absolute humidity in the vehicle and to use the latent heat for warming the passenger compartment when the vehicle is driving.

By employing means for making good use of the moisture-absorbing property of the dehumidifying agent to absorb moisture due to insensible perspiration of a passenger onto the dehumidifying agent when the vehicle is driving, and for regenerating the dehumidifying agent when the vehicle is stopped, or parked, by using commercial electricity, it is possible to eliminate the necessity of providing dual capacity dehumidifying agent for the regeneration and the moisture absorption, which is the case of conventional desiccant devices. The dehumidifying agent of a large capacity can be used only for absorbing moisture when the vehicle is driving. This offers greater flexibility in determining a shape of the dehumidifying agent. In addition, a simplified structure can be used to control the air passages during the moisture absorption and regeneration.

More specifically, the dehumidification agent can be static component so that a dehumidification agent of a large capacity can be placed even within a limited space. No complicated mechanical components are required which are necessary for conventional desiccant systems to rotate the dehumidifying agent or to control flow of process air and regeneration air. This allows production of a light and compact anti-fog and HVAC system for electric vehicles.

In addition, the anti-fog and HVAC system for electric vehicles according to the present invention makes it possible to remove the haze or fog or prevent the formation of dew on the windows of the electric vehicle as well as to warm the passenger compartment in winter. This allows the reduction of the consumption of electricity stored in an on-board storage battery to a minimum level.

Furthermore, the absolute humidity of the air inside the passenger compartment can be kept low in summer. This results in a lower amount of water condensation required in an electric compression refrigerator, improving operating efficiency of a compression refrigeration cycle. Besides, a refrigerator may be reduced in size and weight.

DETAILED DESCRIPTION OF THE INVENTION

In the present invention, the capacity of a dehumidifying agent is increased in order to provide sufficient dehumidification even in driving an electric or hybrid vehicle for a long period of time. Thus, the dehumidification agent is different in shape and structure from those conventionally used.

In addition, the dehumidifying agent absorbs moisture due to insensible perspiration of a passenger when an electric and hybrid vehicle is driving while the dehumidifying agent is regenerated when the vehicle is stopped. It is not necessary to regenerate the dehumidifying agent during the time when it is used for absorbing moisture. This feature provides a simple dehumidification unit.

Embodiment 1

Figure 1:
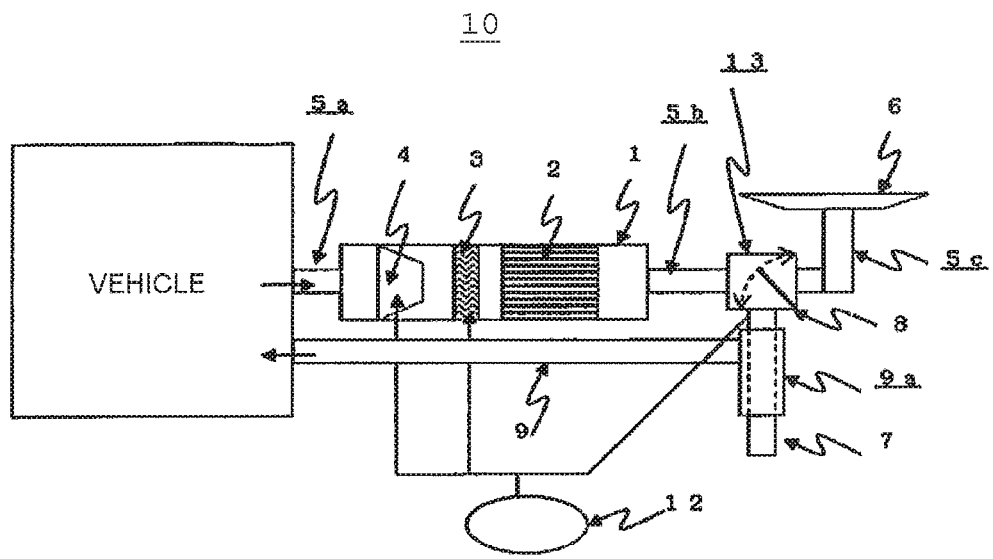
FIG. 1 is a view showing a configuration of an anti-fog and HVAC system mounted on an electric vehicle, according to the present invention.

FIG. 1 shows a schematic configuration of an anti-fog and HVAC system (10) for electric or hybrid vehicles according to the present invention.

The anti-fog and HVAC system (10) comprises a dehumidification unit (1), a dehumidifying element (2), an electric heater (3), a blower fan (4) (the dehumidifying element (2), the electric heater (3), and the blower fan (4) are contained in the dehumidification unit (1)), a ventilation duct (5b) provided downstream of the dehumidification unit (1), an anti-fog nozzle (6) and an exhaust duct (7) which are provided downstream of the ventilation duct (5b), a guide vane (8) that routes the air flow to the anti-fog nozzle (6) and the exhaust duct (7), a tube (9a) that is concentrically arranged with the exhaust duct (7), and an outside air inlet duct (9).

The dehumidification unit (1) comprises the ventilation ducts (5a) and (5b) at the respective ends thereof. The ventilation duct (5b) is connected to an air flow routing device (13) that is operated in response to a command from a controller (12). The air flow routing device (13) has two air outlets. One air outlet is connected to the anti-fog nozzle (6) through a ventilation duct (5c). The other outlet is connected to the exhaust duct (7). The exhaust duct (7) is mounted so that it faces the bottom of the vehicle. The air flow routing device (13) has the guide vane (8). This guide vane (8) operates to block the opening communicated with either the ventilation duct (5c) or the exhaust duct (7), under the control of the controller (12). In addition, the exhaust duct (7) has the tube (9a) surrounding the outside air inlet duct (9). The outer diameter of tube (9a) is larger by about 20 mm than that of the exhaust duct (7). One end of the outside air inlet duct (9) is connected to the passenger compartment. The controller (12) controls the electric heater (3) and the blower fan (4) in the dehumidification unit (1) as well as the operation of the guide vane (8) in the air flow routing device (13) to open and close the air passages according to the driving mode of the anti-fog and HVAC system (10).

Now, described is how the anti-fog and HVAC system (10) in the electric or hybrid vehicle is driven for the regeneration operation when the vehicle is stopped. The electric heater (3) and the blower fan (4) provided within the dehumidification unit (1) are operated by using commercial electricity. The blower fan (4) forces the air within the passenger compartment to the electric heater (3). The air is heated by the electric heater (3) and the relative humidity of the air decreases. This hot air of low relative humidity absorbs moisture from the dehumidifying element (2) when it passes through the dehumidifying element (2). The dehumidification produces air having low temperature and high humidity. This cold wet air is exhausted to the outside through the exhaust duct (7).

The exhaust duct (7) has a double-tube configuration with the surrounding outer tube (9a) through which the outside air is taken into the vehicle. Since the air pressure in the passenger compartment is reduced when the blower fan (4) operates, the outside air flows into the vehicle through the outside air inlet duct (9). The exhaust air of high humidity passing through the exhaust duct (7) exchanges heat with the outside cold air flowing into the vehicle. The exhaust air of high humidity loses heat when it passes through the exhaust duct (7). As a result, moisture condensation may occur within the exhaust duct (7). The dew produced is drained out under gravity.

Next, described is how the anti-fog and HVAC system (10) in an electric or hybrid vehicle absorbs moisture when it is driving. The vehicle uses electricity stored in a storage battery (11) (not shown) equipped on the vehicle to force the air in the passenger compartment to the dehumidifying element (2) through the blower fan (4). The dehumidifying element (2) absorbs moisture in the air passing through it, so that the absolute humidity of the air is decreased. At the same time, the latent heat released by the dehumidifying agent as it absorbs moisture is used for warming the flowing air to produce hot air. This hot air of low relative humidity is blown to the windows including the front window through the ventilation duct (5) and then through the anti-fog nozzle (6) which are provided downstream of the dehumidification unit (1) to remove the haze or fog or prevent formation of dew on the windows.

Figure 2:
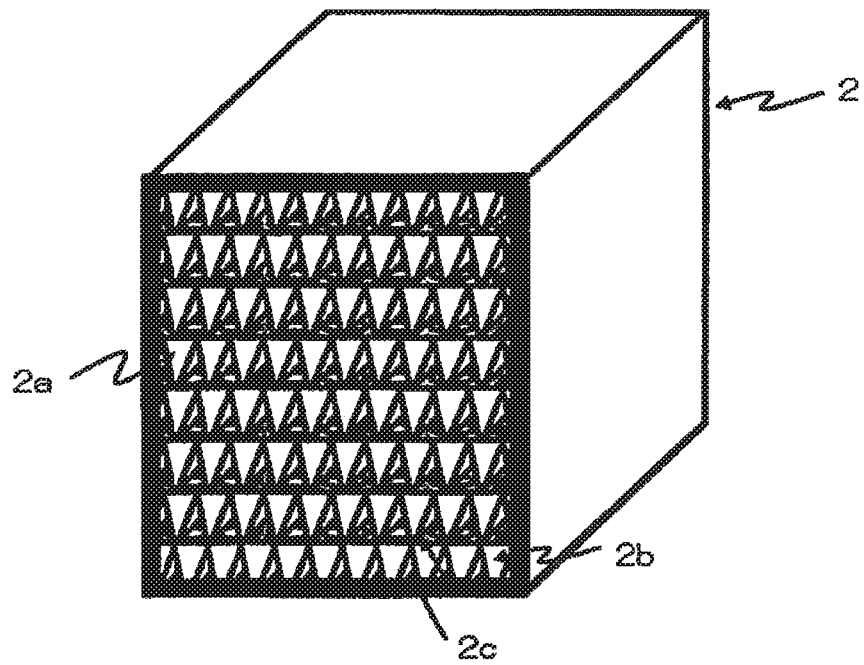
FIG. 2 is a view used to describe a shape of a dehumidifying agent contained in a dehumidification unit.

FIG. 2 is a view used to describe a shape of the dehumidifying element (2) contained in the dehumidification unit (1).

The dehumidifying element (2) is a combination of thin corrugated cardboards coated with a polymer sorbent material which are laminated on top of each other.

The dehumidifying element (2) comprised of fluted corrugated sheet materials (2b) and flat linerboards (2c) which are alternately laminated on top of each other in such a manner that openings (2a) are defined between them.

The flat linerboard (2c) has a lot of vent holes.

In addition, the dehumidifying element (2) is a cube-shaped member with solid surfaces excluding surfaces with the openings (2a) therein.

An anti-fog and HVAC system for a vehicle has been developed in which two or more dehumidification units (1) are provided within an electric or hybrid vehicle. The dehumidification unit (1) contains a fixed dehumidifying element (2) of a large capacity capable of absorbing moisture.

This anti-fog and HVAC system comprises means for producing warm air by using commercial electricity when the vehicle is stopped for charging a battery; and means for heating and regenerating the dehumidifying agent within the dehumidification unit using the warm air.

As the dehumidifying element (2), those capable of absorbing as much moisture as possible per unit volume are advantageous. Taken this into consideration, the dehumidifying element (2) contained in said dehumidification unit (1) used is a structure made of corrugated cardboards laminated on top of each other, the structure including fluted corrugated sheet materials (2b) coated with dehumidifying agent capable of absorbing moisture, such as a polymer sorbent material or an imogolite adsorbent, and flat linerboards (2c) having vent holes In order to make good use of a limited space within a vehicle, it is possible to use a structure made by providing a mixed compound of powder and clay having dehumidification properties, forming a significant number of vent holes aligned in one direction in the mixed compound, and sintering the mixed compound into a solid member. For similar reasons, the dehumidifying element (2) contained in the dehumidification unit (1) may be an assembly made of three-dimensional structures having two or more projections on which a polymer sorbent material or an imogolite adsorbent is coated.

As described above, a contact area is increased between the dehumidifying element (2) used in the anti-fog and HVAC system (10) for electric vehicles, and the air passing through it. The weight density of the contained or carried dehumidifying element (2) is significantly increased. Accordingly, it is possible to remove the haze or fog or prevent the formation of dew and warm the passenger compartment only by operating the blower fan (4) even when the electric vehicle is driving for a ling period of time. Power supply from the storage battery (11) can thus be reduced.

More specifically, the present invention has two or more dehumidification units (1) which are provided within an electric or hybrid vehicle, in which each dehumidification unit contains the dehumidifying element (2) capable of absorbing moisture. The electric heater (3) and the blower fan (4) are provided in the dehumidification unit (1). The electric heater (3) and the blower fan (4) are operated by using commercial electricity when the electric or hybrid vehicle is stopped. The heated hot air of low relative humidity is introduced into the dehumidifying element (2). The air leaving from the regenerated dehumidifying element (2) is exhausted to the outside.

On the other hand, when the vehicle is driving, the air with moisture due to insensible perspiration of a passenger is introduced into the dehumidifying element (2). The moisture in the air is absorbed on the dehumidifying element (2) to reduce the absolute humidity and increase the temperature, producing air of low relative humidity. This hot air of low relative humidity is blown to the front or rear windows. In this way, it is possible to provide the anti-fog and HVAC system (10) for electric vehicles that can remove the haze or fog or prevent the formation of dew on the windows.

In particular, the present invention clearly defines the configuration of the anti-fog and HVAC system (10) and the dehumidification unit (1) for electric vehicles as follows, so that applicability in electric or hybrid vehicles has been established.

More specifically, the present invention provides an anti-fog and HVAC system (10) for an electric or hybrid vehicle including a dehumidification unit provided between a first ventilation duct (5a) for directing the air within a passenger compartment into an anti-fog nozzle (6), and said anti-fog nozzle (6), wherein:

said first ventilation duct (5a) is connected to said passenger compartment at one end thereof, and connected to one end of said dehumidification unit (1) at the other end thereof, and comprising:

a second ventilation duct (5b) connected to the other end of said dehumidification unit (1);

a third ventilation duct (5c) connected at one end thereof to said anti-fog nozzle (6);

an outside air inlet duct (9) connected at one end thereof to said passenger compartment for taking outside air into said passenger compartment;

an exhaust duct (7) for exhausting the air in said passenger compartment to the outside;

an air flow routing device (13) having a first bore, a second bore, a third bore, and a guide vane (8) provided inside, the first bore being connected to said exhaust duct (7), said second bore being connected to the other end of said third ventilation duct (5c), said third bore being connected to said second ventilation duct (5b), said guide vane (8) being adapted to operate to route the air that has passed through the dehumidifying agent, supplied from said second ventilation duct (5b) connected to said dehumidification unit (1) into said third ventilation duct (5c) or route the same air into said exhaust duct (7); and a tube (9a) that is larger in diameter than said exhaust duct (7), into which said exhaust duct (7) is inserted, the tube (9a) having a forth bore formed in the side at one end thereof close to said air flow routing device (13), the other end of said outside air inlet duct (9) being connected to the fourth bore, wherein said dehumidification unit (1) being larger in hydraulic equivalent diameter than said first ventilation duct (5a), said second ventilation duct (5b), said third ventilation duct (5c), the exhaust duct (7), said outside air inlet duct (9), and the tube (9a), said dehumidification unit (1) containing a blower fan (4) on the side close to said first ventilation duct (5a), a heater (3) provided on the back of the blower fan (4), a dehumidifying element (2) provided on the back of the heater (3), and a hollow portion having a predetermined size provided on the back of the dehumidifying element (2), dehumidification unit (1) being configured to force the air from the hollow portion into said second ventilation duct (5b).

Even when an electric compression refrigerator which is mounted on an electric or hybrid vehicle is used for decreasing the temperature within a passenger compartment, it is possible to provide air of low absolute humidity by using the dehumidifying agent in the dehumidification unit to absorb moisture due to insensible perspiration of a passenger as well as moisture from the entering outside air.

Thus, the electric compression refrigerator is required to cool only the air of low absolute humidity, preventing or reducing water condensation (vapor condensation) in an evaporator. This allows the electric compression refrigerator to be released from the load of cooling and dehumidifying the air. The refrigerator is only required to cool the air to a target temperature (generally about 25° C.) Accordingly, it is possible to provide an anti-fog HVAC system for electric vehicles to be operated with high refrigeration efficiency.

The present invention uses a material that exhibits a high moisture absorption rate at a high relative humidity and a low moisture absorption rate at a low relative humidity, such as a polymer sorbent material or imogolite, as the dehumidifying agent. It can be operated with a dry air having relative humidity of about 20% during the regeneration of the dehumidifying agent, achieving sufficient regeneration of the dehumidification agent. In driving, it is possible to provide a significant difference in moisture absorption rate even when the air in the passenger compartment has a relative humidity of about 60%, reducing the packed amount of the dehumidifying agent. Consequently, there is provided a light and compact anti-fog HVAC system for electric vehicles.

DENOTATION OF SYMBOLS AND REFERENCE NUMERALS

1 . . . dehumidification unit
2 . . . dehumidifying agent
2a . . . openings in the dehumidifying agent
2b . . . fluted corrugated sheet materials
2C . . . flat linerboards
3 . . . electric heater
4 . . . blower fan
5, 5a, 5b, 5c . . . ventilation ducts
6 . . . anti-fog nozzle
7 . . . exhaust duct
8 . . . guide vane
9 . . . outside air inlet duct
9a . . . tube
10 . . . anti-fog and HVAC system
11 . . . storage battery
12 . . . controller
13 . . . air flow routing device

The invention claimed is:

1. An anti-fog and HVAC system for an electric vehicle, including:
   an anti-fog nozzle through which the air within a passenger compartment is blown to an inner surface of at least a front window of the electric vehicle when it is driving,
   a dehumidification unit to which the air within the passenger compartment is introduced,
   an air flow routing device,
   an exhaust duct connected to the air flow routing device at one end thereof for exhausting the air in said passenger compartment to an exterior thereof; and
   an outside air inlet duct connected at a first end to the passenger compartment such that outside air flows directly into the passenger compartment without first flowing into the dehumidification unit, wherein:
   the air flow routing device operates to route the air that has passed through the dehumidification unit into: (i) said anti-fog nozzle, or (ii) said exhaust duct, and
   said dehumidification unit contains a blower fan on a first end close to the passenger compartment, a dehumidifying element on a second end close to the anti-fog nozzle, and a heater provided between the blower fan and the dehumidifying element, such that: (i) when the electric vehicle is driven, the dehumidification unit absorbs moisture, and (ii) when the electric vehicle is not being driven and is stopped, the dehumidification unit is regenerated to remove moisture therefrom.

2. The anti-fog and HVAC system of claim 1, wherein:
   when the electric vehicle is being driven, the air flow routing device routes the air that has passed through the dehumidification unit into said anti-fog nozzle; and
   when the electric vehicle is stopped and/or when a battery of the electric vehicle is being charged, the heater operates for regenerating the dehumidifying element, and the air flow routing device routes the air that has passed through the dehumidification unit into the exhaust duct.

3. The anti-fog and HVAC system of claim 1, further comprising the outside air inlet duct connected at the first end thereof to said passenger compartment for taking outside air into said passenger compartment in such a manner that the outside air flows to the dehumidification unit through the passenger compartment.

4. The anti-fog and HVAC system of claim 3, wherein the dehumidification unit comprises:

a first ventilation duct having a first end connected to the passenger compartment, and having a second end connected to the first end of the dehumidification unit, a second ventilation duct having a first end connected to the second end of the dehumidification unit, and having a second end connected to the air flow routing device, a third ventilation duct for connecting the anti-fog nozzle and the air flow routing device to one another, wherein a second end of the outside air inlet duct surrounds the exhaust duct for allowing heat exchange between the exhaust air from the dehumidification unit and the outside air flowing into the outside air inlet duct.

5. The anti-fog and HVAC system of claim 4, wherein:

the air flow routing device includes a first bore, a second bore, a third bore, and a guide vane provided therein, the first bore being connected to said exhaust duct, the second bore being connected to a first end of said third ventilation duct, the third bore being connected to the second end of the second ventilation duct;

the guide vane operates to route the air that has passed through the dehumidifying element and passed through the second ventilation duct into: (i) the third ventilation duct, or (ii) the exhaust duct; and the dehumidification unit contains the blower fan on the first side close to said first ventilation duct at a first distance from the first ventilation duct, the heater provided on a back of the blower fan at a second distance therefrom, the dehumidifying element provided on a back of the heater at a third distance therefrom, and a hollow portion having a predetermined size provided on a back of the dehumidifying element, the dehumidification unit being configured to force the air from the hollow portion into said second ventilation duct.

6. The anti-fog and HVAC system of claim 1, wherein said dehumidifying element is provided as a structure made of corrugated cardboards laminated on top of each other, the structure including fluted corrugated sheet materials coated with a polymer sorbent material or an imogolite adsorbent, and flat linerboards.

7. The anti-fog and HVAC system of claim 1, wherein a second end of the outside air inlet duct surrounds the exhaust duct for allowing heat exchange between the exhaust air from the dehumidification unit and the outside air flowing into the outside air inlet duct.

* * * * *